United States Patent
Enami et al.

(10) Patent No.: US 8,967,127 B2
(45) Date of Patent: Mar. 3, 2015

(54) INTAKE APPARATUS FOR INTERNAL COMBUSTION ENGINE

(75) Inventors: Masatatsu Enami, Wako (JP); Osamu Watanabe, Wako (JP); Akihiro Katsuura, Wako (JP); Shinji Wakamoto, Wako (JP); Takayuki Namai, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 13/493,256

(22) Filed: Jun. 11, 2012

(65) Prior Publication Data

US 2012/0325186 A1    Dec. 27, 2012

(30) Foreign Application Priority Data

Jun. 27, 2011 (JP) ................................. 2011-141899

(51) Int. Cl.
| | |
|---|---|
| *F02M 35/104* | (2006.01) |
| *F02M 25/07* | (2006.01) |
| *F02M 35/10* | (2006.01) |
| *F02M 35/112* | (2006.01) |

(52) U.S. Cl.
CPC ... *F02M 35/10262* (2013.01); *F02M 35/10222* (2013.01); *F02M 35/112* (2013.01); *Y02T 10/146* (2013.01)
USPC ................. 123/568.17; 123/568.11

(58) Field of Classification Search
CPC ...... F02M 35/104; F02M 25/07; F02M 35/10
USPC .................. 123/568.17, 406.48, 568.18, 217,
123/406.45, 568.12, 184.38, 184.42,
123/184.47, 568.11
See application file for complete search history.

(56) References Cited

U.S. PATENT DOCUMENTS

2007/0017490 A1*   1/2007   Sasaki et al. ............. 123/568.17

FOREIGN PATENT DOCUMENTS

| JP | 2-185658 A | 7/1990 |
|---|---|---|
| JP | 3-73649 U | 7/1991 |
| JP | 10-196466 A | 7/1998 |
| JP | 11-247727 A | 9/1999 |
| JP | 2000-80963 A | 3/2000 |

(Continued)

OTHER PUBLICATIONS

Japanese Office Action dated Apr. 23, 2013, issued in corresponding Japanese Patent Application No. 2011-141899.

(Continued)

*Primary Examiner* — Stephen K Cronin
*Assistant Examiner* — Xiao Mo
(74) *Attorney, Agent, or Firm* — Westerman, Hattori, Daniels & Adrian, LLP

(57) ABSTRACT

An intake apparatus for an internal combustion engine includes a plurality of branch pipes connected at downstream ends thereof to an engine main body, an intake chamber to which upstream ends of the branch pipes are connected, and a common intake air introducing part connected to the center of the intake chamber in a cylinder arrangement direction. The intake chamber includes a projecting part projecting toward the engine main body relative to the common intake air introducing part. An EGR introducing passage is connected to the center of the projecting part in the cylinder arrangement direction. A downstream end of the EGR introducing passage is directed toward a wall of the projecting part on the common intake air introducing part side.

8 Claims, 4 Drawing Sheets

(56) References Cited

FOREIGN PATENT DOCUMENTS

| JP | 2003-201926 A | 7/2003 |
|---|---|---|
| JP | 2005-155449 A | 6/2005 |
| JP | 2009-203920 A | 9/2009 |

OTHER PUBLICATIONS

Japanese Office Action dated Oct. 29, 2013, issued in corresponding Japanese Application No. 2011-141899.

* cited by examiner

INTAKE APPARATUS FOR INTERNAL COMBUSTION ENGINE

CROSS REFERENCES TO RELATED APPLICATIONS

The present application claims priority under 35 U.S.C. §119 to Japanese Patent Application No. 2011-141899, filed Jun. 27, 2011, entitled "Intake Apparatus for Internal Combustion Engine." The contents of this application are incorporated herein by reference in their entirety.

TECHNICAL FIELD

The present disclosure relates to an intake apparatus for an internal combustion engine in which an EGR introducing passage is connected to an intake chamber of an intake manifold.

BACKGROUND

As a technique used in intake apparatuses for supplying intake air to an internal combustion engine, the exhaust gas recirculation (EGR) technique for mixing part of exhaust gas, exhausted from an internal combustion engine, into intake air and recirculating the exhausted gas mixed into the intake air so as to achieve reduction of nitrogen oxide contained in the exhaust gas is used. When mixing the EGR gas with the intake air, it is desirable to sufficiently mix the EGR gas with the intake air (fresh air). Thus, various techniques for promoting mixing have been proposed. For example, Japanese Unexamined Patent Application Publication No. 10-196466 discloses a device in which a premixing chamber is provided, and Japanese Unexamined Utility Model Registration Application Publication No. 3-73649 discloses a device in which a partition plate having a plurality of holes is provided at an outlet port of EGR gas so as to distribute the EGR gas.

On the other hand, in order to solve the problems with these devices, such as the complicated shape of the intake manifold and the increased size, an intake apparatus has been proposed in which an air connector having a deflecting part for deflecting a main flow of intake air introduced from a common intake air introducing pipe is formed continuously at an end of a surge tank in a cylinder arrangement direction, and an EGR pipe is open to the inside of the air connector such that the flow of EGR gas promotes deflection of the main flow by the deflecting part (see Japanese Unexamined Patent Application Publication No. 2009-203920).

However, even in the intake apparatus disclosed in Japanese Unexamined Patent Application Publication No. 2009-203920, since the air connector and the opening for the EGR gas are arranged at the end of the surge tank in the cylinder arrangement direction, the EGR gas may not be uniformly distributed to a plurality of cylinders. Further, promotion of deflection of the intake air by the EGR gas flow, in turn, generates a vortex in the intake air to promote mixing, but the vortex reduces the flow rate of the intake air. Then, the intake efficiency may be reduced, and EGR gas may not be sufficiently mixed with the intake air.

SUMMARY

Accordingly, the present disclosure provides an intake apparatus for an internal combustion engine capable of uniformly distributing EGR gas to a plurality of cylinders and sufficiently mixing intake air with the EGR gas.

According to an aspect of the present disclosure, there is provided an intake apparatus for an internal combustion engine that includes: a plurality of branch pipes connected at downstream ends thereof to an engine main body; an intake chamber to which upstream ends of the branch pipes are connected; and a common intake air introducing part connected to the substantial center of the intake chamber in a cylinder arrangement direction, wherein the intake chamber includes a projecting part projecting toward the engine main body relative to the common intake air introducing part; wherein an EGR introducing passage is connected to the substantial center of the projecting part in the cylinder arrangement direction; and wherein a downstream end of the EGR introducing passage is directed toward a wall of the projecting part on the common intake air introducing part side.

The expression "directed toward a wall" as used herein indicates that the downstream end is oriented so as to cause the flowed-out air current therefrom to head toward the wall, and this should not be considered as limited to a specific embodiment disclosed herein. With this configuration, both the intake air and the EGR gas are substantially introduced into the center of the intake chamber, and it is therefore possible to uniformly distribute the EGR gas to the cylinders. Further, the EGR gas is not directed directly toward the common intake air introducing part, but is directed toward the wall of the projecting part on the common intake air introducing part side. Therefore, it is possible to prevent soot in the EGR gas from adhering to intake components, such as a throttle valve, disposed in the common intake air introducing part.

Further, in the above-described intake apparatus, the common intake air introducing part may have a curved shape forming an arc, the center of the arc being on the engine main body side.

With this configuration, the intake air flowing from the common intake air introducing part into the intake chamber forms a vortex along the curved shape, so that the EGR gas is drawn into the vortex and can be sufficiently mixed with the intake air.

Further, in the above-described intake apparatus, upstream ends of the plurality of branch pipes may be connected to the wall of the projecting part on the engine main body side, and the EGR introducing passage may be disposed between openings of adjacent branch pipes.

With this configuration, the EGR introducing passage is aligned with the branch pipes, which allows the intake manifold to be compact.

Further, in the above-described intake apparatus, the wall of the projecting part toward which the downstream end of the EGR introducing passage is directed may have a curved shape forming an arc, the center of the arc being on the intake chamber side.

With this configuration, EGR gas can flow smoothly to a mixing area, where the EGR gas is to be mixed with intake air, along the curved surface of the wall.

Further, in the above-described intake apparatus, the wall of the projecting part on the engine main body side may have a curved shape which is convex toward the engine main body with respect to the cylinder arrangement direction.

With this configuration, the EGR gas can flow smoothly to each of the branch pipes along the curved surface of the wall.

Further, in the above-described intake apparatus, the common intake air introducing part may be connected to the intake chamber in a direction (upward direction) orthogonal to a direction (front-rear direction) in which the intake chamber faces the engine main body and orthogonal to the cylinder arrangement direction (lateral direction), and the EGR introducing passage may include a parallel part extending substantially parallel to the branch pipes, and a curved part that curves from the parallel part toward the common intake air introducing part.

With this configuration, the EGR introducing passage is aligned with the branch pipes, which allows the intake manifold to be compact and the intake air to be sufficiently mixed with the EGR gas.

Further, in the above-described intake apparatus, the curved part may curve vertically upward, and a communication passage communicating with a chamber section of the intake chamber may be provided at a joint between the curved part and the parallel part to allow discharge of condensed water.

With this configuration, it is possible to prevent condensed water from collecting in the EGR introducing passage.

According to the above-described aspect of the present disclosure, the intake apparatus for an internal combustion engine can uniformly distribute EGR gas to the plurality of cylinders and sufficiently mix intake air with the EGR gas.

BRIEF DESCRIPTION OF THE DRAWINGS

The advantages of the disclosure will become apparent in the following description taken in conjunction with the drawings, in which.

DETAILED DESCRIPTION

An intake apparatus 10 for an internal combustion engine (hereinafter referred to as the "engine E") according to an embodiment of the present disclosure will be described with reference to the accompanying drawings. It is to be noted that positions and directions mentioned in the following description correspond to the directions of arrows shown in FIG. 1.

Figure 1:
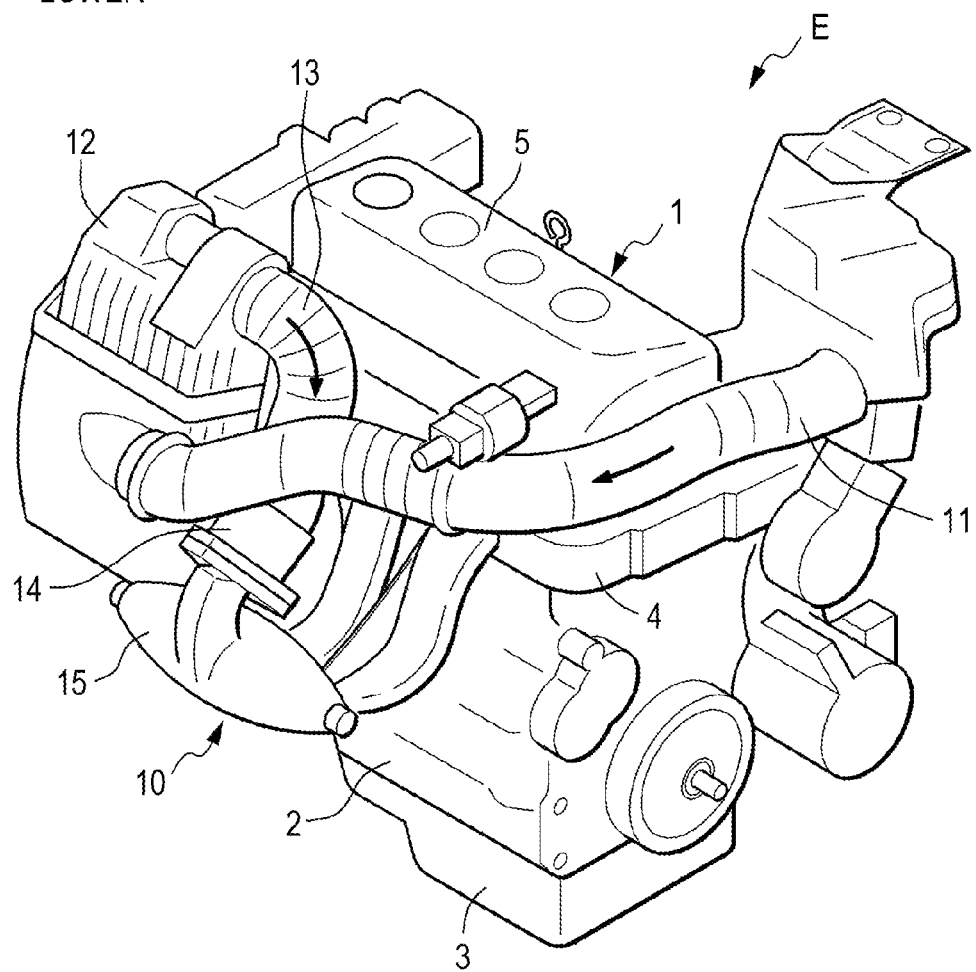
FIG. 1 is a schematic perspective view illustrating an engine including an intake apparatus according to an embodiment of the present disclosure.

As shown in FIG. 1, the engine E is an in-line four-cylinder four-stroke OHC engine and includes an engine main body 1 and the downflow intake apparatus 10 as main components. The engine main body 1 includes a cylinder block 2, an oil pan 3, a cylinder head 4, and a cylinder cover 5. The downflow intake apparatus 10 includes an intake pipe 11, an air cleaner 12, an intake connecting pipe 13, a throttle valve 14, and an intake manifold 15. The intake valve 11 extends along an upper lateral side of the engine main body 1, to the rear of the engine main body 1. The air cleaner 12 is disposed above and to the rear of the engine main body 1 and connected to a downstream end of the intake pipe 11. The intake connecting pipe 13 is connected at an upstream end thereof to the upper part of the air cleaner 12 and extends substantially vertically. The throttle valve 14 is disposed at a downstream end (lower end) of the intake connecting pipe 13. The intake manifold 15 is connected to the throttle valve 14.

Figure 2:
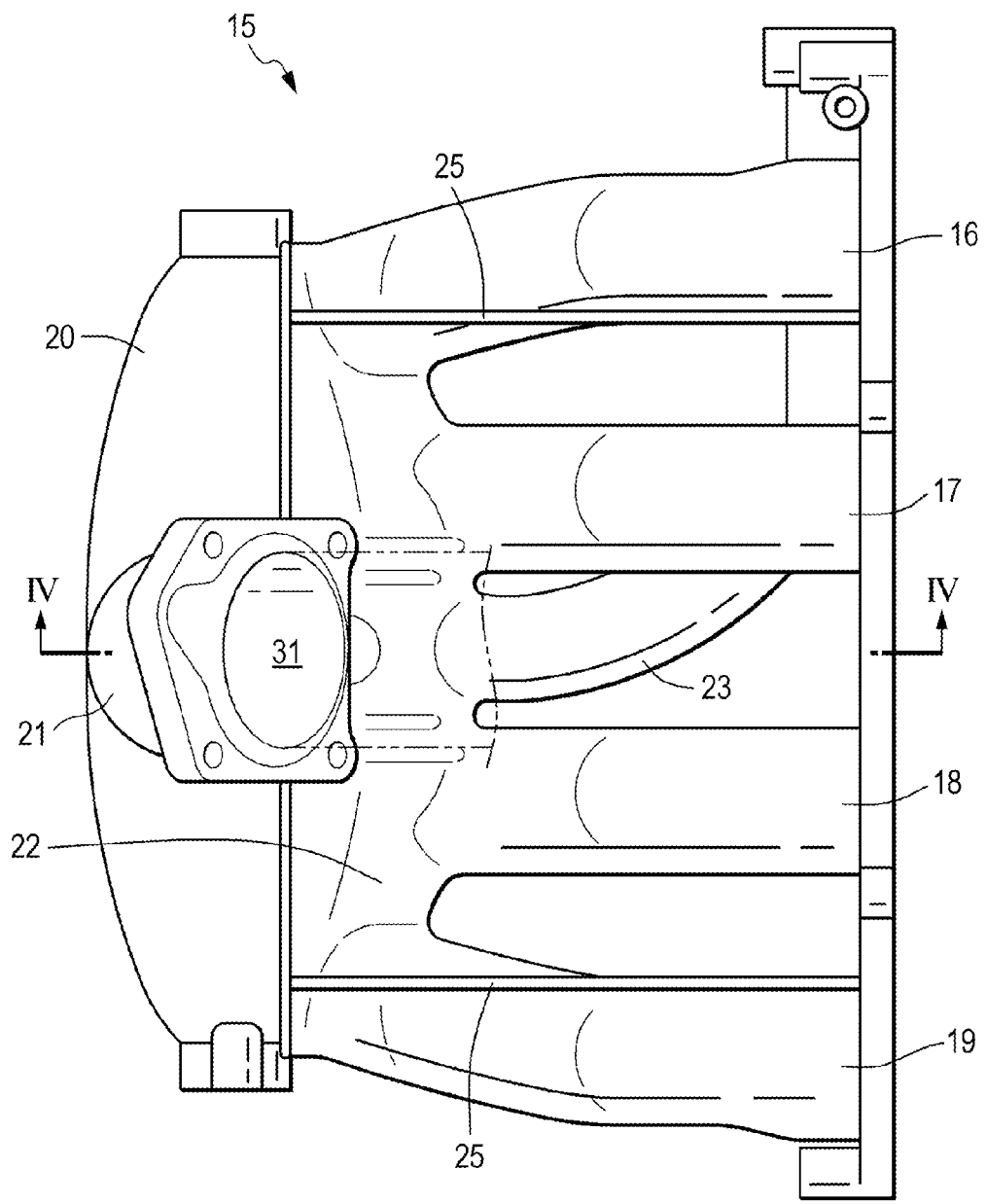
FIG. 2 is a plan view illustrating an intake manifold shown in FIG. 1.
Figure 3:
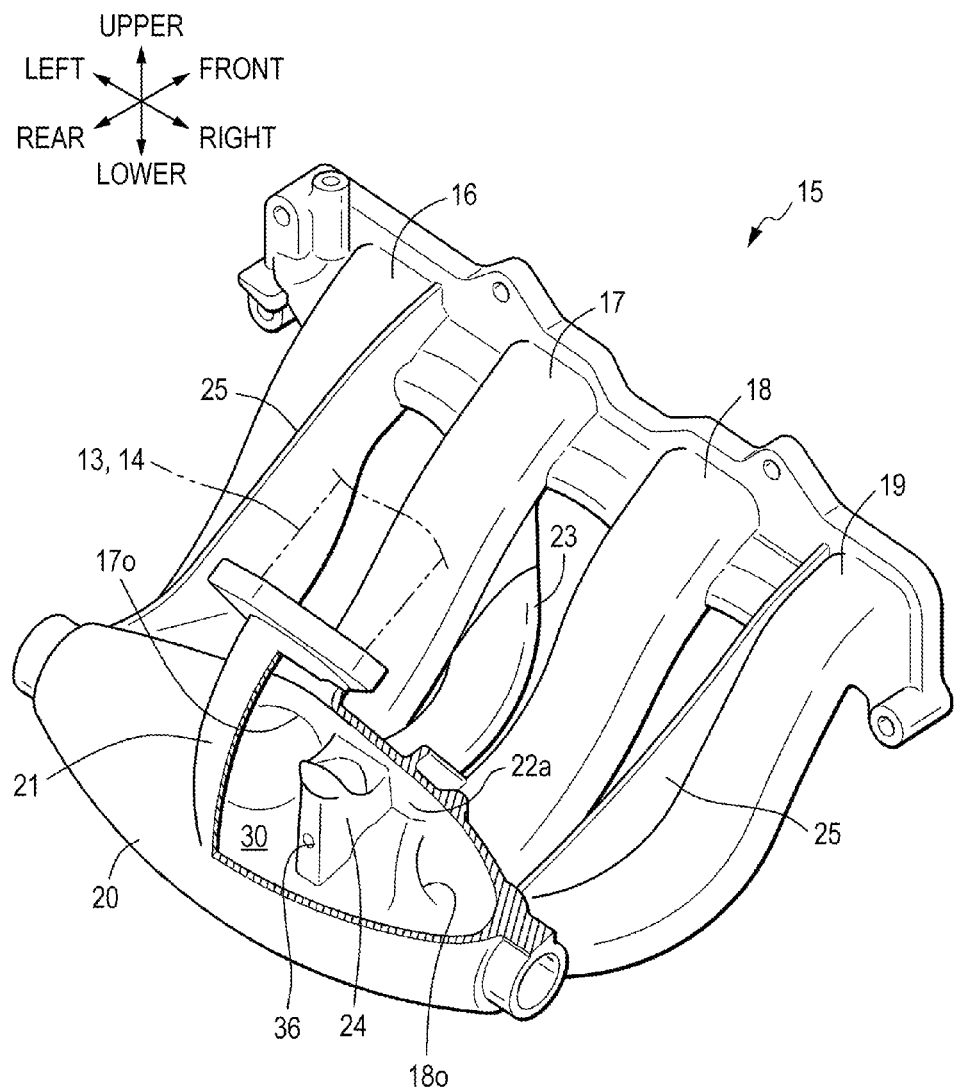
FIG. 3 is a partially cut-away perspective view illustrating the intake manifold shown in FIG. 1.

Referring to FIGS. 2 and 3, the intake manifold 15 includes four branch pipes 16 to 19, an intake chamber 20, and a common intake air introducing part 21. The four branch pipes 16 to 19 are connected at downstream ends thereof to the rear side of the engine main body 1. The intake chamber 20 is disposed at the rear of the engine main body 1 to face the engine main body 1 and is connected to upstream ends of the branch pipes 16 to 19. The common intake air introducing part 21 is connected to a downstream end of the intake connecting pipe 13 (throttle valve 14) and connected to the center of the intake chamber 20 in a cylinder arrangement direction.

The intake chamber 20 has a substantially elongated spherical shape like a rugby ball, and has a chamber section 30 of the same shape therein. The intake chamber 20 is arranged such that the longitudinal axis is parallel to the cylinder arrangement direction.

The common intake air introducing part 21 extends obliquely from an upper front position toward a lower rear position while curving to form an arc having a center on the engine main body 1 side, and is connected substantially vertically to the rear of the intake chamber 20. That is, the common intake air introducing part 21 is connected to the intake chamber 20 in a direction (upward direction) orthogonal to the direction (front-rear direction) in which the intake chamber 20 faces the engine main body 1 side and orthogonal to the cylinder arrangement direction (lateral direction).

Figure 4:
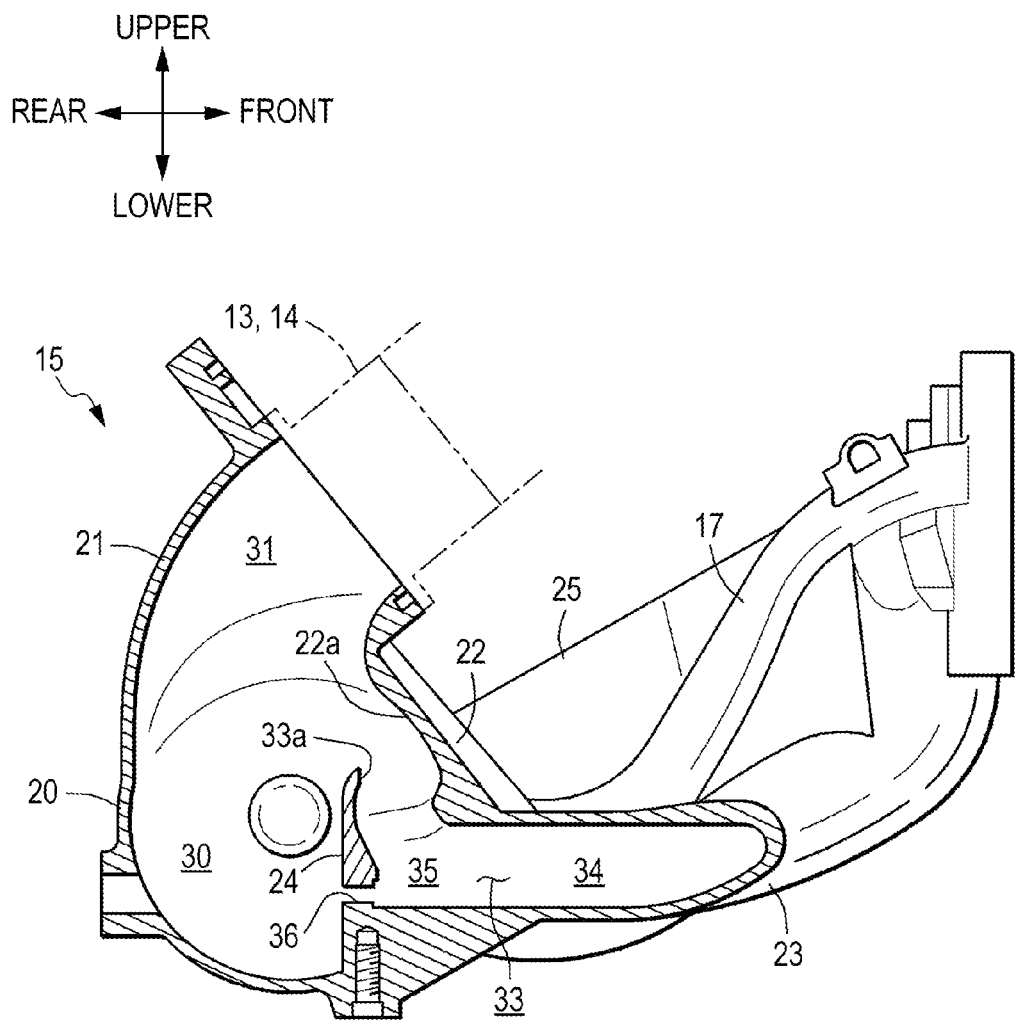
FIG. 4 is a cross-sectional view taken along the line IV-IV in FIG. 2.

The common intake air introducing part 21 has a circular cross-sectional shape and, as shown in FIG. 4, has a common intake air introducing passage 31 therein. The common intake air introducing part 21 has a diameter smaller than a diameter of the intake chamber 20 at the axial center thereof. Thus, a projecting part 22 projecting forward (toward the engine main body 1) relative to the common intake air introducing part 21 is formed in the intake chamber 20. The projecting part 22 may be hollow.

Further, since the intake chamber 20 has a substantially elongated spherical shape like a rugby ball as mentioned above, a wall 22a of the projecting part 22 on the engine main body 1 side has a curved shape which is convex toward the engine main body 1 with respect to the cylinder arrangement direction.

The four branch pipes 16 to 19 individually form intake branch passages. In a plan view, the branch pipes 16 to 19 are connected at each upstream portion thereof to the curved wall 22a of the projecting part 22 on the engine main body 1 side, extend substantially orthogonal to the wall 22a and extend radially substantially horizontally, and then individually curve upward so as to be connected at each downstream end thereof to the rear side of the engine main body 1.

The two branch pipes (second and third branch pipes) 17 and 18 arranged at the inner side are connected to a lower front portion of the intake chamber 20 close to the center of the intake chamber 20 and having a relatively large sectional area (sectional area orthogonal to the longitudinal axis). The two branch pipes (first and fourth branch pipes) 16 and 19 arranged at the outer side are connected to front portions of the intake chamber 20 close to the ends of the intake chamber 20 and having a relatively small sectional area. A rib 25 is formed integrally with each of the two outer first and fourth branch pipes 16 and 19 and extends from an upstream end to a downstream end of each of the branch pipes 16 and 19. The rib 25 extends substantially vertically and projects inwardly from the curved center part of each of the branch pipes 16 and 19.

An EGR introducing pipe 23 forming an EGR introducing passage 33 is connected to the center of the intake chamber 20 in the axial direction (the cylinder arrangement direction), i.e., the center of the projecting part 22. The EGR introducing passage 33 is designed to mix part of the exhaust gas exhausted from the engine E into intake air and recirculate the exhausted gas mixed into the intake air. The EGR introducing passage 33 forms a part of the intake apparatus 10 of the engine E.

The EGR introducing passage 33 extends from an upstream end thereof at a joint with an exhaust pipe (not shown) disposed at the front side of the engine main body 1, is guided toward the rear of the engine main body 1 through the inside of the cylinder head 4, extends downward, and curves rearward while passing under the second branch pipe 17. Then, a downstream part of the EGR introducing passage 33 extends substantially parallel to and substantially horizontally with the second and third branch pipes 17 and 18 so as to be connected to (disposed at) a lower part of the wall 22a of the projecting part 22 between openings 17o and 18o of the adjacent second and third branch pipes 17 and 18 in the intake chamber 20.

An extension wall 24 is formed integrally with the intake chamber 20 and extends substantially vertically upward from a lower wall of the intake chamber 20 such that the EGR introducing passage 33 further extends from the wall 22a of the projecting part 22 in the chamber section 30. As shown in FIG. 4, a lower part of the extension wall 24 is formed to have a curved surface such that the EGR introducing passage 33 smoothly curves upward. Thus, the EGR introducing passage 33 has a parallel part 34 extending substantially parallel to the second and third branch pipes 17 and 18, and a curved part 35 curving vertically upward (toward the common intake air introducing part 21) from a downstream end of the parallel part 34.

A communication passage 36 extending through the extension wall 24 to allow communication between the EGR introducing passage 33 and the chamber section 30 is formed at a joint between the curved part 35 and the parallel part 34 of the EGR introducing passage 33 so as to allow discharge of condensed water contained in the EGR gas from the EGR introducing passage 33 into the chamber section 30.

Further, the upper end of the extension wall 24 is formed to curve toward the engine main body 1. Accordingly, a downstream end 33a of the EGR introducing passage 33 is directed toward the wall 22a of the projecting part 22 on the common intake air introducing part 21 side. Since the EGR introducing passage 33 is configured as described above and the intake chamber 20 has a substantially elongated spherical shape like a rugby ball as mentioned above, the wall 22a of the projecting part 22 toward which the downstream end 33a of the EGR introducing passage 33 is directed has a curved shape forming an arc having a center on the intake chamber 20 side (the side opposite to the engine main body 1).

As described above, the intake chamber 20 includes the projecting part 22 projecting toward the engine main body 1 relative to the common intake air introducing part 21; the EGR introducing passage 33 is connected to the center of the projecting part 22 in the cylinder arrangement direction; and the downstream end 33a of the EGR introducing passage 33 is directed toward the wall 22a of the projecting part 22 on the upper side (the common intake air introducing part 21 side). With this configuration, both the intake air and the EGR gas are introduced into the center of the intake chamber 20, and it is therefore possible to uniformly distribute the EGR gas to the branch pipes 16 to 19 (cylinders). Further, the EGR gas flowing from the EGR introducing passage 33 into the intake chamber 20 is not directed directly toward the common intake air introducing part 21, but is directed toward the wall 22a of the projecting part 22 on the common intake air introducing part 21 side. Therefore, it is possible to prevent soot in the EGR gas from adhering to the throttle valve 14 disposed in the common intake air introducing part 21.

Further, the common intake air introducing part 21 is formed to have a curved shape having a center on the engine main body 1 side. With this configuration, the intake air flowing from the common intake air introducing part 21 into the intake chamber 20 forms a vortex along the curved shape, so that the EGR gas is drawn into the vortex and is sufficiently mixed with the intake air.

Meanwhile, the upstream ends of the four branch pipes 16 to 19 are connected to the wall 22a of the projecting part 22 on the engine main body 1 side, and the EGR introducing passage 33 is disposed between the openings 17o and 18o of the adjacent second and third branch pipes 17 and 18. With this configuration, the EGR introducing passage 33 is aligned with the second and third branch pipes 17 and 18, which allows the intake manifold 15 to be compact.

Since the wall 22a of the projecting part 22 toward which the downstream end 33a of the EGR introducing passage 33 is directed has a curved shape forming an arc having a center on the rear side (intake chamber 20 side), the EGR gas smoothly flows to a mixing area, where the EGR gas is to be mixed with intake air, along the curved surface of the wall 22a. Moreover, since the wall 22a of the projecting part 22 on the engine main body 1 side has a curved shape which is convex toward the engine main body 1 with respect to the cylinder arrangement direction, the EGR gas smoothly flows to each of the branch pipes 16 to 19 along the curved surface of the wall 22a.

Further, the common intake air introducing part 21 is introduced from the upward direction (a direction orthogonal to the direction in which the intake chamber 20 faces the engine main body 1 and the cylinder arrangement direction), and the EGR introducing passage 33 includes the parallel part 34 extending substantially parallel to the second and third branch pipes 17 and 18, and the curved part 35 curving from the parallel part 34 toward the common intake air introducing part 21. With this configuration, the EGR introducing passage 33 is aligned with second and third branch pipes 17 and 18, which allows the intake manifold 15 to be compact and the intake air to be sufficiently mixed with the EGR gas.

Furthermore, the curved part 35 curves vertically upward, and the communication passage 36 communicating with the chamber section 30 of the intake chamber 20 is provided at a joint between the curved part 35 and the parallel part 34 to allow discharge of condensed water. With this configuration, it is possible to prevent condensed water from collecting in the EGR introducing passage 33.

The present disclosure is not limited to the above-described embodiment, and variations and modifications in the shape, arrangement, and number of components may be made without departing from the scope of the present disclosure. For example, in the above description, the intake apparatus 10 according to the above-described embodiment of the present disclosure is applied to the in-line four-cylinder engine E. However, the intake apparatus 10 may be applied to a two-cylinder engine, an in-line six-cylinder engine, a V engine, and so forth. It is to be noted that since the EGR introducing passage 33 is disposed at the center of the intake chamber 20 in the cylinder arrangement direction, it is preferable, but not limited to, that an even number of branch pipes be connected to the intake chamber 20. Further, the intake apparatus 10 according to the above-described embodiment of the present disclosure does not necessarily require all the components described above, and these components may be employed or omitted without departing from the scope of the present disclosure.

We claim:

1. An intake apparatus for an internal combustion engine, comprising:
   a plurality of branch pipes connected at downstream ends thereof to an engine main body;
   an intake chamber to which upstream ends of the branch pipes are connected; and
   a common intake air introducing part connected to a substantial center of the intake chamber in a cylinder arrangement direction,
   wherein the intake chamber includes a projecting part projecting toward the engine main body relative to the common intake air introducing part, the projecting part projecting in a direction orthogonal to a connection direction of the common intake air introducing part to the intake chamber and orthogonal to the cylinder arrangement direction;
   wherein an EGR introducing pipe is connected to a substantial center of the projecting part in the cylinder arrangement direction, the EGR introducing pipe constituting an EGR introducing passage;
   wherein an extension wall is disposed in the intake chamber so as to extend the EGR introducing passage from a wall of the projecting part to inside of the intake chamber, and
   wherein a downstream end of the EGR introducing passage is directed toward the wall of the projecting part on a common intake air introducing part side by the extension wall.

2. The intake apparatus for an internal combustion engine according to claim 1, wherein the common intake air introducing part has a curved shape forming an arc, the center of the arc being on an engine main body side.

3. The intake apparatus for an internal combustion engine according to claim 1,
   wherein upstream ends of the plurality of branch pipes are connected to the wall of the projecting part on an engine main body side; and
   wherein the EGR introducing passage is disposed between openings of the adjacent branch pipes.

4. The intake apparatus for an internal combustion engine according to claim 1, wherein the wall of the projecting part toward which the downstream end of the EGR introducing passage is directed has a curved shape forming an arc, the center of the arc being on an intake chamber side.

5. The intake apparatus for an internal combustion engine according to claim 1, wherein the wall of the projecting part on an engine main body side has a curved shape which is convex toward the engine main body with respect to the cylinder arrangement direction.

6. The intake apparatus for an internal combustion engine according to claim 1,
   wherein the common intake air introducing part is connected to the intake chamber in a direction orthogonal to a direction in which the intake chamber faces the engine main body and orthogonal to the cylinder arrangement direction; and
   wherein the EGR introducing passage includes a parallel part extending substantially parallel to the branch pipes, and a curved part that curves from the parallel part toward the common intake air introducing part.

7. The intake apparatus for an internal combustion engine according to claim 6,
   wherein the curved part curves vertically upward; and
   wherein a communication passage communicating with a chamber section of the intake chamber is provided at a joint between the curved part and the parallel part to allow discharge of condensed water.

8. An intake apparatus for an internal combustion engine, comprising:
   a plurality of branch pipes connected at downstream ends thereof to an engine main body;
   an intake chamber to which upstream ends of the branch pipes are connected; and
   a common intake air introducing part connected to a substantial center of the intake chamber in a cylinder arrangement direction,
   wherein the intake chamber includes a projecting part projecting toward the engine main body relative to the common intake air introducing part, the projecting part projecting in a direction orthogonal to a connection direction of the common intake air introducing part to the intake chamber and orthogonal to the cylinder arrangement direction,
   wherein an EGR introducing pipe is connected to the projecting part so as to communicate with an inside of the intake chamber, the EGR introducing pipe constituting an EGR introducing passage,
   wherein an extension wall is disposed in the intake chamber so as to extend the EGR introducing passage from a wall of the projecting part to the inside of the intake chamber,
   wherein a downstream end of the EGR introducing passage is directed toward the wall of the projecting part on a common intake air introducing part side by the extension wall, and
   wherein the downstream end of the EGR introducing passage is disposed at a substantial center of the projecting part in the cylinder arrangement direction.

* * * * *